US005570511A

United States Patent [19]

Reich et al.

[11] Patent Number: 5,570,511

[45] Date of Patent: Nov. 5, 1996

[54] HAND CIRCULAR SAW WITH SWINGING PROTECTIVE HOOD AND CUTTING DEPTH ADJUSTING DEVICE

[75] Inventors: Doris Reich; Rainer Schilling, both of Stuttgart; Wolfgang Fuchs, Filderstadt; Eduard Gansel, Dettenhausen; Karl-Heinz Braunbach, Frickenhausen; Heribert Schramm, Stuttgart; David Matzo, Leinfelden-Echterdingen, all of Germany

[73] Assignee: Robert Bosch GmbH, Stuttgart, Germany

[21] Appl. No.: 375,638

[22] Filed: Jan. 20, 1995

[30] Foreign Application Priority Data

Feb. 2, 1994 [DE] Germany .......................... 44 03 189.0

[51] Int. Cl.[6] .............................. B23D 47/02; B27B 9/02

[52] U.S. Cl. ................................................ 30/376; 30/390

[58] Field of Search ............................. 30/375, 376, 377, 30/390

[56] References Cited

U.S. PATENT DOCUMENTS

| | | | |
|---|---|---|---|
| 1,854,510 | 4/1932 | Haas | 30/376 |
| 2,488,947 | 11/1949 | Vavrik | 30/376 |
| 2,543,486 | 2/1951 | Briskin | 30/376 |
| 3,262,472 | 7/1966 | McCarty et al. | 30/390 |
| 4,856,394 | 8/1989 | Clowers | 83/56 |

*Primary Examiner*—Hwei-Siu Payer

*Attorney, Agent, or Firm*—Michael J. Striker

[57] ABSTRACT

A hand circular saw comprises a swinging protective hood, a housing which carries a saw shaft axis and a saw blade held rotatable about the saw blade axis, a base plate, the housing being arranged independently turnably relative to the base plate around two further axes extending substantially perpendicular to one another, a first of the further axes being parallel to the saw shaft axis for guiding a turning movement for adjusting a cutting depth and is adjustable on a cutting depth guiding bracket with a scale, while a second of the further axes extends both parallel to the base plate and also parallel to the saw blade for guiding a turning movement for adjusting a miter angle, the cutting depth guiding bracket having an angle-profile shaped cross-section and having at least one leg which is formed as a sliding guide supporting the housing in each cutting depth position.

27 Claims, 5 Drawing Sheets

HAND CIRCULAR SAW WITH SWINGING PROTECTIVE HOOD AND CUTTING DEPTH ADJUSTING DEVICE

BACKGROUND OF THE INVENTION

The present invention relates to a hand circular saw with a swinging protective hood and with a cutting depth adjusting device.

Hand circular saws of the above mentioned general type are known in the art. One of such saws is disclosed for example in U.S. Pat. No. 4,856,394. A hand circular saw disclosed in this reference and having a swinging protective hood, a cutting depth adjusting device and a miter angle adjusting device is shortly called a standard hand circular saw. The cutting depth is determined by the distance of projection of the saw blade under the base plate. It is adjusted by turning the saw blade on and off relative to the base plate about an axis extending parallel to the rotary axis of the saw blade in turning bearings or guides, and arresting the saw blade in the desired position by clamping means relative to the base plate or the cutting depth guiding bracket. The hand circular saw is supported on a workpiece by means of the base plate, and therefore the angular and height position of the saw blade relative to the workpiece is controlled better than in the case of free suspending not supported systems. The adjusting devices provide a high degree of freedom for the saw blade with a simultaneous accurate guidance relative to the workpiece.

The standard hand circular saws are predominantly utilized for displacement sawing and rarer for plunge sawing. For the plunge sawing special saws are developed which have no swinging protective hood. Their saw blade is turnable back and forth together with the motor or transmission housing relative to the saw blade housing and the base blade for adjusting the cutting depth. The cutting depth adjustment is not arrestable on safety reasons, but instead is limited by abutment means. In some cases because of the safety reasons, instead of the swinging protective hood, spring means of the saw blade are pressed to the position of the minimal cutting depth. The safety reasons relate basically to the injury danger for the operator in view of the saw blade projecting downwardly of the base plate, when the hand saw blade is removed from the workpiece and the saw blade does not simultaneously retreat above the base plate. The so-called plunge saws, in view of the absent cutting depth clamping, are less favorable for displacement sawing than the standard hand circular saws.

During displacement sawing with the standard circular saws the turning bearing and guides in the case of the fixedly clamped cutting depth adjustment are loaded only by the weight forces of the saw, or in other words very little. Moreover, because of the clamping an especially stable connection is obtained between the housing and the cutting depth guiding bracket or the base plate, and therefore the saw blade during the displacement sawing remains stable in its desired plane.

During plunge cutting with the standard hand circular blades, in addition to the weight forces also the reaction forces act on the cutting depth adjusting device through the tool engagement in the workpiece. The clamping of the housing relative to the cutting depth guiding bracket is prohibited here, since otherwise no variable cutting depth adjustment required for the plunge cutting will be possible. Thereby the guidance of the housing relative to the base plate or relative to the cutting depth guiding bracket is less stable than during the displacement sawing and the cutting depth guiding bracket is loaded higher than during the displacement sawing. There is here the danger that the saw blade during the plunge cutting can displace or tilt from its plane perpendicular to the base plate. Deviation from the required position can lead to canting of the saw blade in the sawing gap, and excessive chips are removed.

Since the plunge saws with standard hand circular saws are now the exception and good plunge saws are provided, the manufacture of the standard hand circular saws paid relatively little attention to the quality of the guide between the housing and the base plate or the cutting depth adjusting bracket. Thereby a high quality plunge sawing with the standard hand circular saws is not possible. In particular the plunge sawing with a miter angle of approximately 45°, the forces acting between the housing and the base plate during feeding in the plunge cutting influence the position of the saw blade and thereby the working output so much that practically an accurate plunge cutting was not possible.

For better understanding of the invention, substantial adjustment steps on standard and circular saws during displacement and plunge sawing are clarified. The following adjustment steps are required during the displacement sawing:

The hand circular saw is placed with the base plate on a fixed substrate;

The clamping screw for arresting of the cutting depth is released;

The housing is turned up and down relative the base plate for obtaining a nominal cutting depth and arrested by tightening of the clamping screw;

The base plate is placed on the edge of the workpiece and the closed swinging protective hood abuts with its end side against the edge of the workpiece;

The hand circular saw with the cutting side is brought in alignment with a predetermined marking line on the workpiece;

The motor is turned on and the displacement sawing starts by a horizontal displacement of the saw, while the swinging protective hood is open by abutting of its end side against the workpiece edge.

The following adjustment steps are required for the plunge sawing with the hand circular saws having a swinging protective hood:

A clamping screw for arresting of the cutting depth is released;

Adjustment of the negative cutting depth is performed by upward turning of the housing with a saw blade relative to the base plate so that the saw teeth facing the base plate extend toward it;

The cutting depth abutment is adjusted and arrested for limiting the cutting depth;

The swinging protective hood is open;

The base plate is placed on the workpiece;

The marking line and the cutting side are brought in alignment;

The motor is switched on;

The operating saw blade is lowered into the workpiece until the adjusted cutting depth, or in other words until abutment of the housing against the cutting depth abutment;

The clamping screw is arrested.

The plunge cutting process is finished, and in this position displacement cutting can continue.

SUMMARY OF THE INVENTION

Accordingly, it is an object of the present invention to provide a hand circular saw which avoids the disadvantages of the prior art.

In keeping with these objects and with others which will become apparent hereinafter, one feature of the present invention resides, briefly stated, in a hand circular saw in which the cutting depth guiding bracket has an angle-profile shaped cross-section, on which at least one leg operating as a sliding guide supports the housing in each cutting depth position.

When the hand circular saw is designed in accordance with the present invention, it has the advantage that due to especially stable cutting depth guide between the housing and the base plate, a universal hand circular saw with a swinging protective hood is formed so that it is equally suitable for plunge cutting and displacement cutting with arrestably adjustable cutting depth and has parts which are simple and inexpensive to produce and mount.

In view of the small play and the great interengaging guiding and sliding surfaces which take up high abutment forces, a shock free cutting depth adjustment is possible and the saw blade is always positioned exactly in its desired plane.

Because of this quasi play-free guidance, the plunge sawing is possible in particular with a miter angle of up to 45°–60°, arcuately with channel free cutting surfaces providing a minimal material removal. In other words, a high efficiency is obtained.

The cutting depth guiding bracket has an L-shaped cross-section and therefore is especially deformation-resistant. Its support the housing to be guided with at least double number of supporting surfaces when compared with the known standard hand circular saws.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
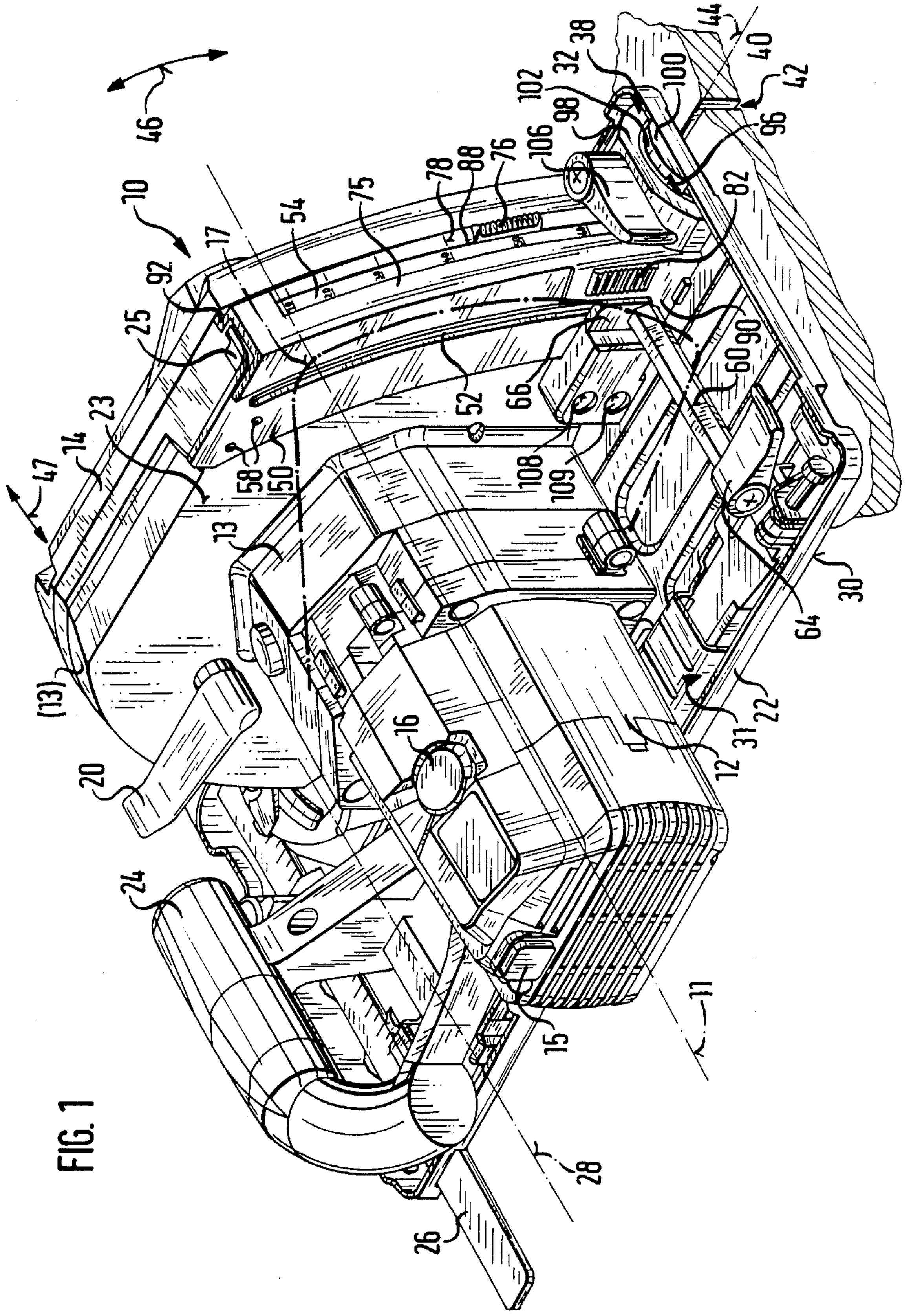
FIG. 1 is a perspective view of an inventive hand circular saw with a swinging protective hood.

A hand circular saw shown in FIG. 1 is identified with reference numeral 10. A saw shaft axis 11 shown in broken line extends through a motor housing 12 and a flanged transmission housing 13 and also through a center of a saw blade (18) which is not shown here.

The reference numerals which relate to parts not visible in the corresponding Figures but shown in the remaining Figures are provided with brackets for better understanding of the invention.

A cover hood 14 is flanged to the transmission housing 13 and protectively covers a saw blade (18) together with the transmission housing 13. The motor housing 12 carries on the top a rotary button 16 for actuation of a rotary speed regulator and laterally a push-button 15 for actuation of a spindle arresting. A handle connected with the transmission housing 13 is shown only schematically in its extension by a dash-dot line 17. Moreover, an actuating lever 20 is turnably arranged on the transmission housing 13 for opening a swinging protective hood (21) shown in FIG. 2.

The transmission housing 13 with the motor housing 12 and the cover hood 14 are arranged jointly on a base plate 22 turnably for a cutting depth change up and down about a first axis 28 in a not shown pin or turning bearing.

The base plate 22 carries an auxiliary handle 24 for reliable two-hand guiding of the hand circular saw during sawing as well as a side abutment 26 for parallel guiding of the hand circular saw 10 with abutment against the edge of the workpiece.

Figure 3:
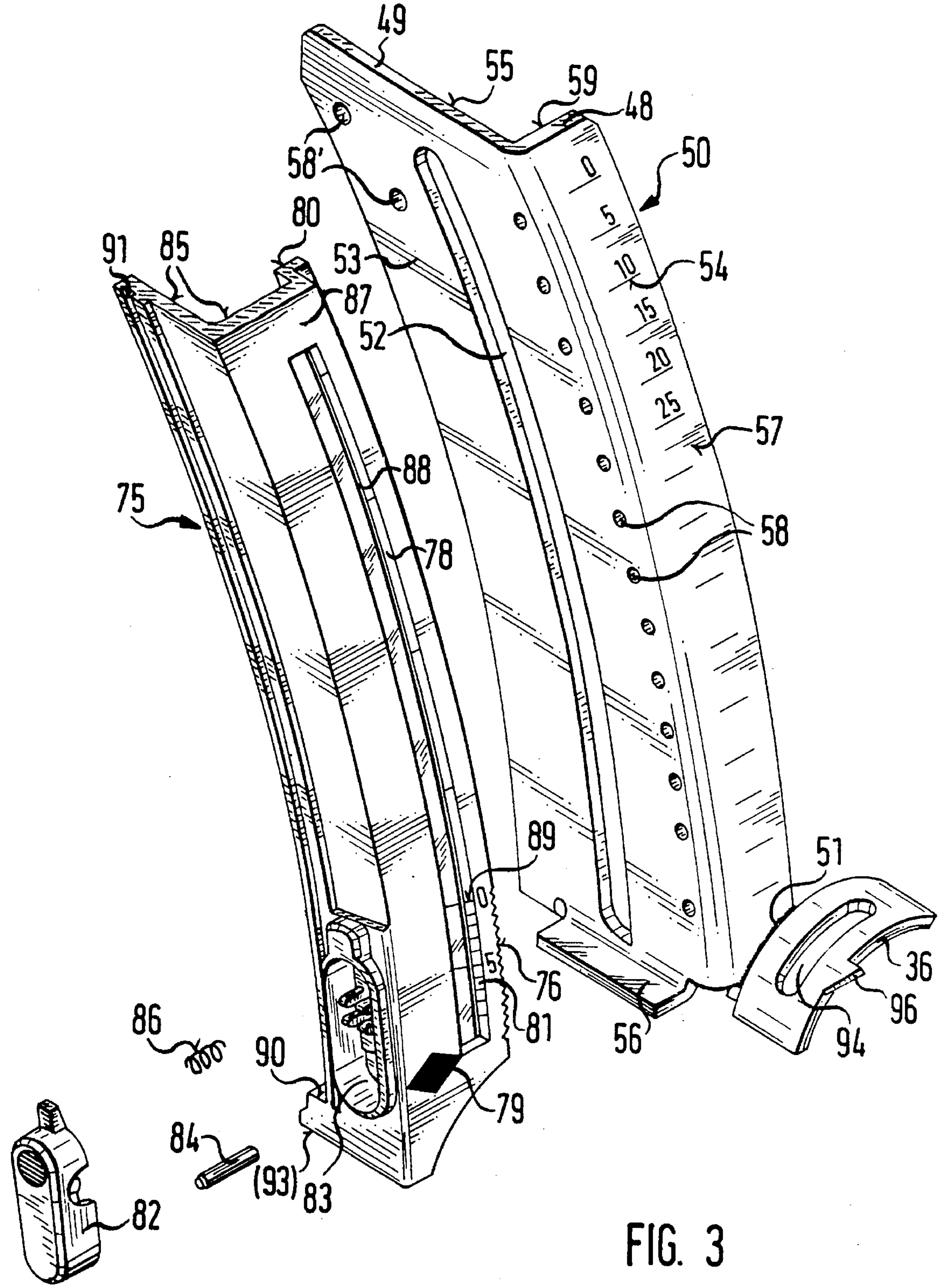
FIG. 3 is a view showing a fragment of a cutting depth guiding bracket with an abutment bracket in an explosion view.

The base plate 22 has a lower side 30 and an upper side 31. A coulisse 32 with a guiding track (34) and a coulisse block (36) shown in FIG. 3 is arranged on the upper side 31. The lower side 30 of the base plate 22 is supported on an upper surface 38 of the workpiece 40. A cutting joint 42 produced by the saw blade (18) extends through the workpiece 40. A second axis 44 extends through the cutting joint 42 on the lower side 30 of the base plate 22 and thereby parallel to the saw blade (18). Therefore the transmission housing 13 together with the motor housing 12, the cover hood 14 and the saw blade (18) is turnably outwardly relative to the base plate 22 for the miter angle cutting from the basic position 90° by 45°–60°. The double arrow 46 identifies the movement directions for adjustment of the cutting depth about a first axis 28. The double arrow 47 identifies the movement directions about the second axis 44 for adjusting the miter angle.

A pointer 96 is arranged on the coulisse 32. It is guided under a clamping ring portion 98 and displaceable relative to a scale 102 of a scale support 100. The pointer 96 identifies a 90° angle position or in other words a straight cut position of the saw blade (18). The clamping ring portion 98 is clampable by the clamping lever 106 so as to arrest the preselected miter angle.

A transmission housing 13 is adjustably clampable on a cutting depth guiding bracket 50 with a central guiding slot 52 and with a scale 54, by a threaded pin 60 and clamping screw lever 64.

A guiding support 66 mountable on the transmission housing 13 by screws 108, 109 abuts laterally against the cutting depth guiding bracket 50 and provides a fixed lateral guidance of the transmission housing 13. The guiding support 66 moreover abuts laterally with a small interengaging region against an abutment bracket 75 which is guided displaceably up and down on the cutting depth guiding bracket 50. The abutment bracket 75 carries a gripping region 76 on its rear 87 relative to the push-button 82, which is used for upward and downward displacement during preselection of a nominal cutting depth.

For accurately adjusting a cutting depth, the abutment bracket 75 carries scales 78, 81 and a window 88. The window 88 allows observation of the scale 54 of the cutting depth guiding bracket 50. Thereby the abutment bracket 75 can be exactly adjusted by means of the scales 78, 81 relative to the scale 54. An arresting pin 84 can be moved by a push-button 82 from its arresting position in which it engages in the arresting opening 58. After actuation of the push-button 82 the abutment bracket 75 can be displaced freely relative to the cutting depth guiding bracket 50 completely upwardly, when the transmission housing 13 is located in the position of minimal cutting depth.

The corresponding curvature of the back 57 of the cutting depth cutting bracket 50, the rear side 23 of the transmission housing 13, and the back 87 of the abutment bracket about the first axis 28 can be clearly recognized here.

Figure 2:
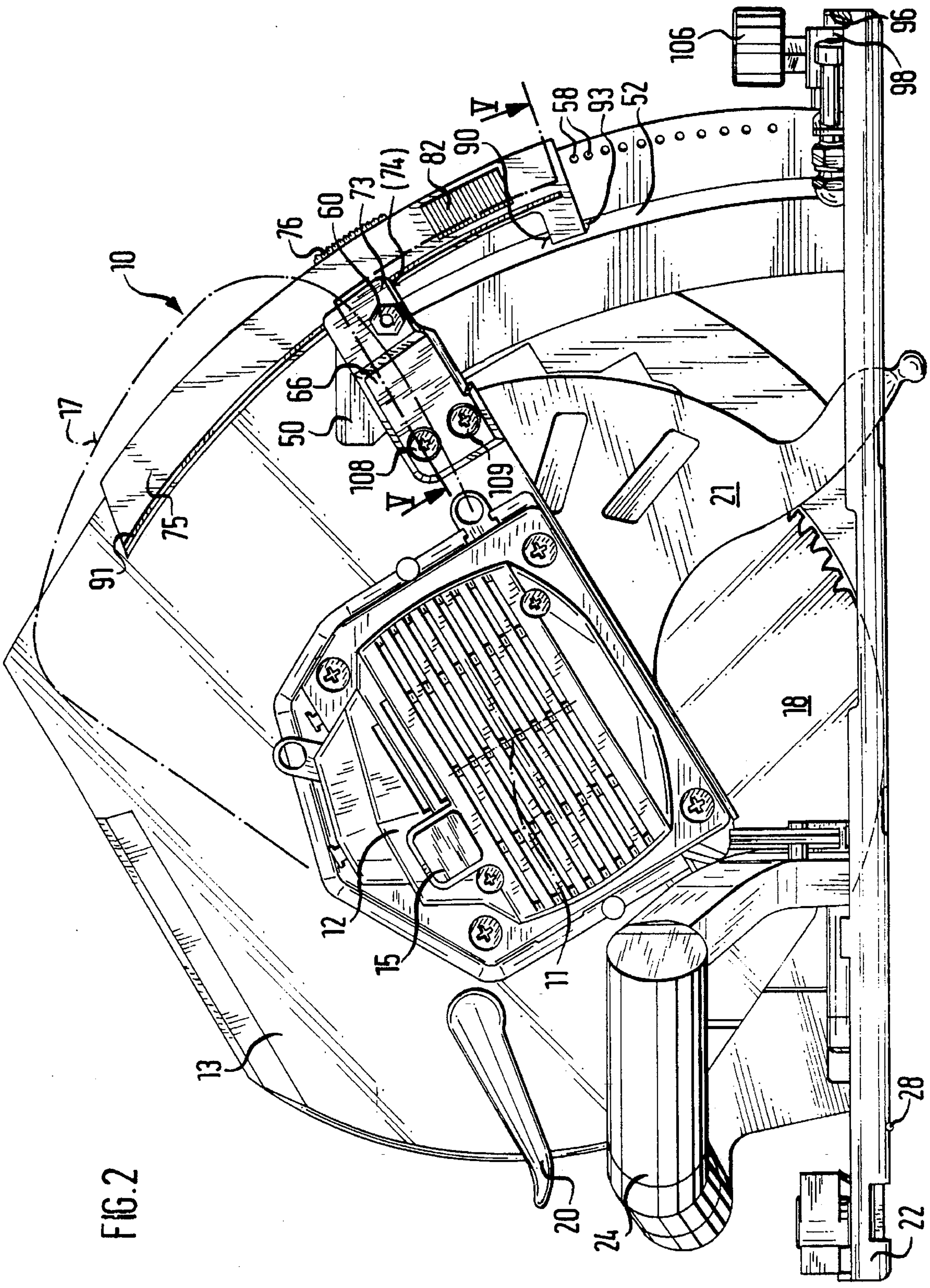
FIG. 2 is a side view of the inventive hand circular saw of FIG. 1.

FIG. 2 shows a side view of FIG. 1 with adjusted negative cutting depth of the hand circular saw 10. In addition to the part shown in FIG. 1, here the saw blade 18 and the swinging protective hood 21 are clearly visible. The parts which correspond to the parts of FIG. 1 are identified with same reference numerals so as not to provide a detailed description again.

The abutment bracket 75 is positionable so that it limits the maximum possible cutting depth to substantially the half. By releasing of the push-button 82 the arresting pin 84 shown in FIG. 3 extends into the arresting openings 58 so that the abutment bracket 75 is fixed non-displaceably relative to the cutting depth guiding bracket 50. The abutment 73 of the guiding support 66 is clearly seen here. An abutment strip 90 of the abutment bracket 75 abuts against it in the adjustment path for adjusting the cutting depth. A cutting depth adjustment extending outwardly beyond the shown position is possible after releasing of the abutment bracket 75 by pressing the push button 82. Moreover, a cam 93 of the abutment bracket 75 is shown here as engaging in the central depth guiding slot 52 of the cutting depth guiding bracket 50.

The explosion view of FIG. 3 shows the cutting depth guiding bracket 50 which is L-shaped and has legs 48, 49, outer surfaces 53, the inner surface 55 and the rear surface 57. The cutting depth guiding bracket 50 is formed here as a support of the coulisse block 36 with a turning guide slot 94 and a pointer 96. The coulisse block 36 is connected by a welding seam 51 with the cutting depth guiding bracket 50. A supporting leg 56 is provided for supporting the guiding depth guiding bracket 50 in the 90° miter angle position relative to the base plate 22.

Figure 5:
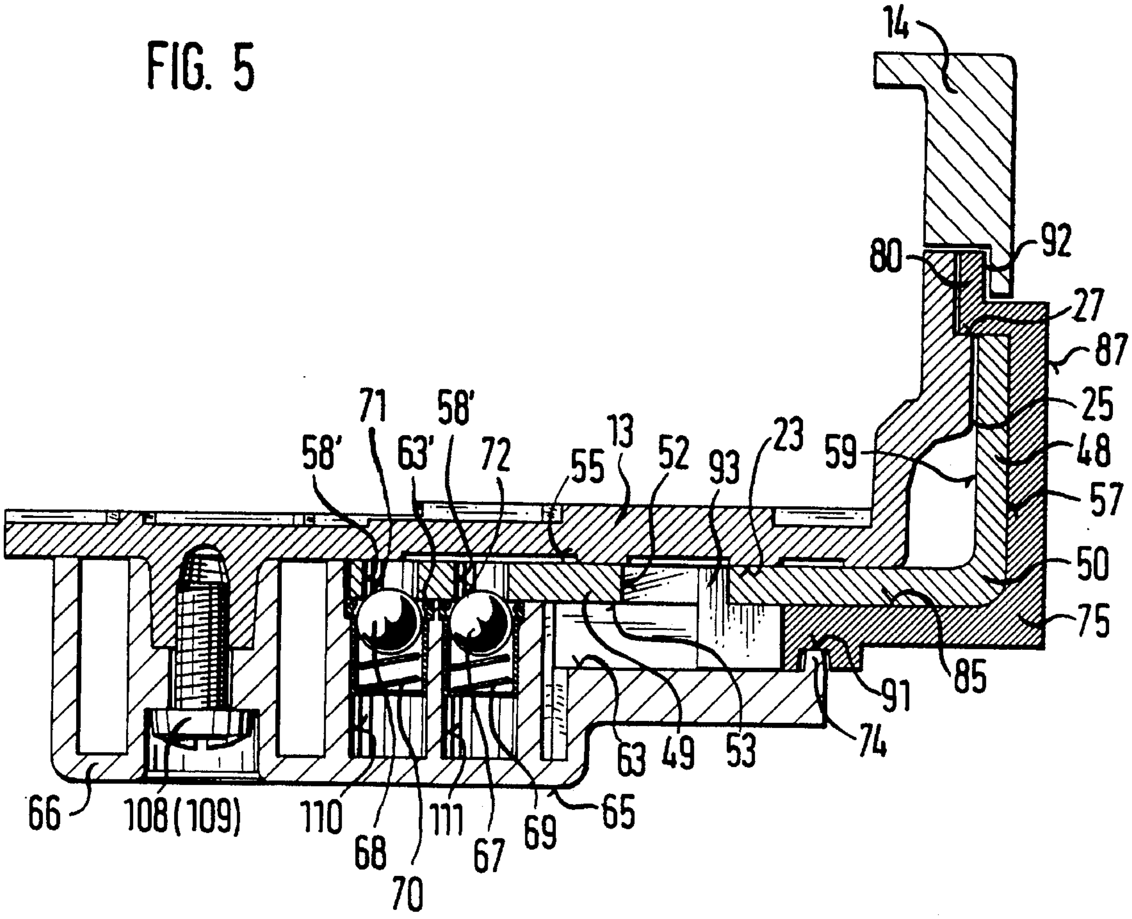
FIG. 5 is a view showing a section through the cutting depth guiding bracket of the hand circular saw with adjacent regions of a transmission housing and with the abutment bracket, taken along the line V—V in FIG. 2.

A C-shaped cross-sectional profile of abutment bracket 75 can be clearly seen in the section V—V (FIG. 5). The inner sides 85 of abutment bracket 75 engages with the outer surface 53 and the rear surface 57 of the cutting depth guiding bracket 50 which carries the scale 54. Here, the slot-like window 88 in the rear region 87 of the abutment bracket 75, the gripping region 76, as well as the scale 78 with a coarse adjustment and with a fine scale 81 can be clearly seen. Moreover, the arresting of the abutment bracket 75 by the push-button 82 is recognizable. The push-button 82 is tiltable in an opening 83 for actuating of the arresting pin 84 and is pretensioned by a spring 86. The arresting pin 84 is associated in its axial extension with the arresting openings 58 in the cutting depth guiding bracket 50.

A groove 91 forms a longitudinal guide for a prismatic guide in the abutment bracket 75. A projection 74 of the guiding support 66 engages in the groove and presses the abutment bracket 75 against the cutting depth guiding bracket so that it is longitudinally displaceable relative to the cutting depth guiding bracket 50.

Figure 4:
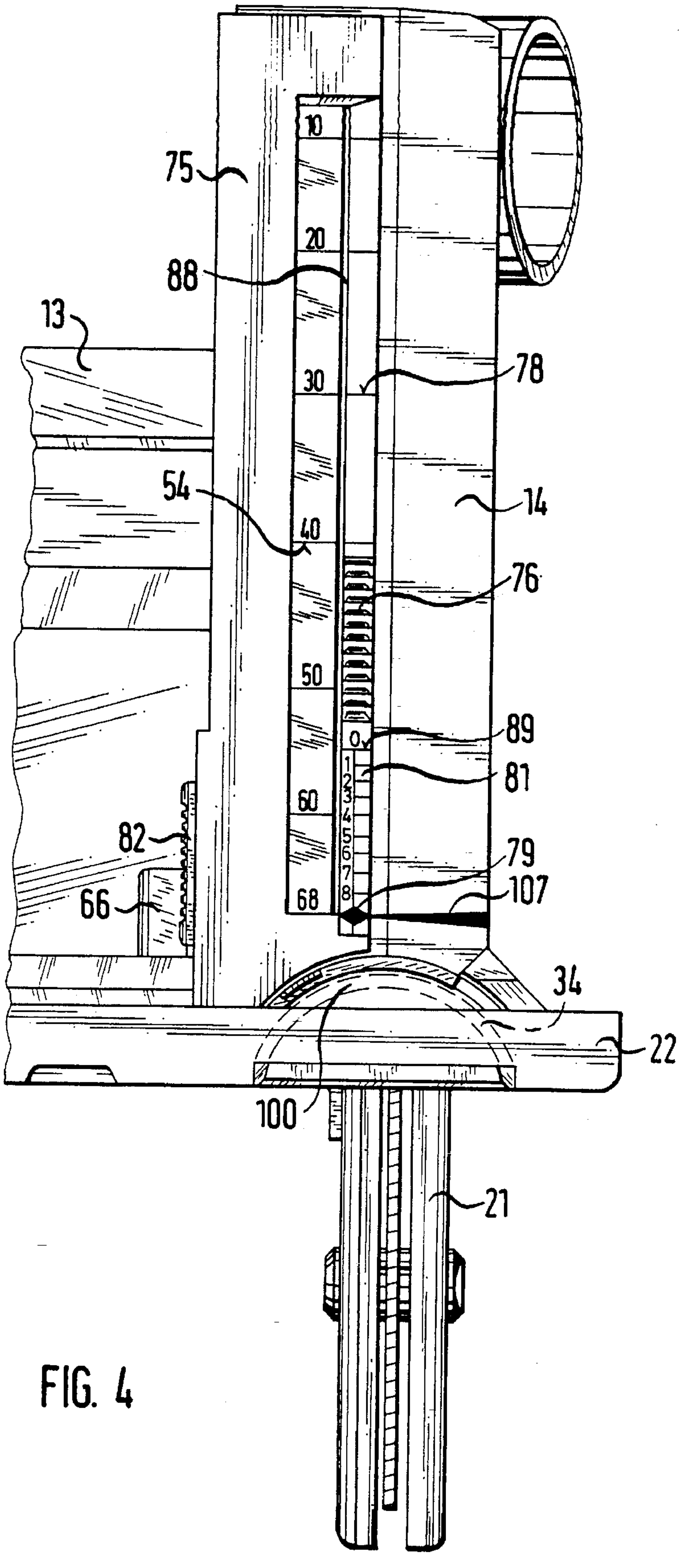
FIG. 4 is a partially sectioned view of the hand circular saw from behind in the region of the cutting depth guiding bracket.

FIG. 4 shows a partial view of the hand circular saw 10 formed in correspondence with FIG. 3. It shows the transmission housing 13, the guiding support 66, the abutment bracket 75 with the gripping region 76, the scale 78, the fine scale 81 and the window 88, the arrow-like zero marking 107 of the cover hood 14, the base plate 22, the swinging protective hood 21, and the push button 82 as well as the scale support 100. The scale support 100 is arranged in a recess of the base plate 22. The guiding track 34 which is bent out of it is identified in dash-dot lines, and the scale support 100 abuts against it from below.

The triangular cutting depth marking 107 is arranged on the cover hood 14. Thereby the transmission housing 13 with the flanged cover hood 14 is preselectively adjustable in a controlled manner relative to the cutting depth guiding support 50.

FIG. 5 shows a section taken along the line V—V in FIG. 2 and clearly illustrates the construction and the cooperation of the transmission housing 13 with the cutting depth guiding bracket 50 and the abutment bracket 75. The transmission housing 13 has an L-shaped section. The cover hood 14 is connected with the shorter leg and operates as a further housing part. It is spaced from the transmission housing 13 by an intermediate space 92. The guiding support 66 is mounted on the outer side 23 of the transmission housing 13 by three screws 108, (109). The second screw 109 is arranged in the sectioned showing under the screw 108 and therefore is identified with reference numeral in brackets in the drawing.

Arresting-supporting balls 67, 68 are arranged in two pockets 110, 111 extending perpendicular to the outer side 23 of the transmission housing and pretensioned by springs 69, 70. They extend over the inner side 63' of the guiding support 66 through outlet opening 71, 72. The balls 67, 68 engage in the arresting opening 58' of the cutting depth guiding bracket 50. In this position the negative cutting depth is secured in accordance with FIG. 2 in an arresting fashion. A slight, quiet force application suffices for the operator to overcome this position and to move the transmission housing 13 together with the remaining parts of the hand circular saw in direction of increasing cutting depth.

The guiding support 66 at the inner side 63 which is opposite to the outer side 65, ends in a projection 74 in the direction toward the right. It extends perpendicular to the cutting depth guiding bracket 50 or the abutment bracket 75. The abutment bracket 75 in its region facing the projection 74 of the guiding support 66 has a groove 91. The projection 74 engages in the groove so that a prismatic guide is formed between the guiding support 66 and the cutting depth guiding bracket 50.

The transmission housing 13 abuts against the inner surfaces 55, 59 of the cutting depth guiding bracket 50 with the outer side 23 and the rear side 25.

The cutting depth guiding bracket 50 is engaged by the C-shaped abutment bracket 75. The abutment bracket engages on the one hand with the cam 93 in the depth guiding slot 52 of the cutting depth guiding bracket 50. On the other hand, the abutment bracket 75 engages with a one-piece second profile, the end side of the cutting depth guiding bracket 50. It projects with an outwardly extending leg 80 into the intermediate space 92 between the cover hood 14 and the transmission housing 13 and is supported on a counteredge 27 of the transmission housing 13.

Thereby the transmission housing 13, the guiding support 66, the cutting depth guiding bracket 50 and the abutment bracket 75 interengage one another in a shell-like manner and support one another so as to form a telescopical prism guide. This guide substantially excludes a lateral play of the transmission housing 13 relative to the cutting depth guiding bracket 50. The abutment bracket 75 operates as a play compensation between the transmission housing 13 and the cutting depth guiding bracket 50 and holds the same non-releasably.

The abutment bracket 75 can never lead the transmission housing 13 in other words it remains always the abutment strip 90 under the abutment 73 of the guiding support 66. The cutting depth selected by means of the abutment bracket 75 can be therefore only greater or equal to the instantaneous actually adjusted cutting depth.

The abutment bracket 75 has two functions. First of all, during plunge sawing it operates as an abutment for limiting a preselected maximum cutting depth. For this purpose the abutment bracket 75 is arrestable by the push button 82 relative to the cutting depth guiding bracket 50 in its arresting openings 58 in a 5 mm distance.

Secondly, during the displacement sawing, it operates with clamped steplessly adjustable cutting depth as an auxiliary means for adjusting an accurate cutting depth within a millimeter region. For this purpose the abutment bracket 75 carries at the edge of the window 88 a scale 78 with coarse marking lines, similar to the scale 54 of the cutting depth guiding bracket 50. Moreover, a fine scale 81 with ten marking lines is arranged between the three lower, coarse lines of the scale 78. Their distance from one another corresponds a respective cutting depth of 1 mm to be adjusted.

The cutting depth is adjusted before the displacement sawing with approximately millimeter accuracy in the following manner:

The transmission housing 13 is arrestingly adjusted relative to the cutting depth guiding bracket 50 in the position of the negative cutting depth in the uppermost dead point. The abutment bracket 75 is displaced relative to the cutting depth guiding bracket 50 or relative to its scale 54 until the zero line 89 of the scale 78 is located on the cutting depth value to be adjusted at the next coming coarse marking and is arrestingly engaged in this position. The nominal amount of the fine scale 81 extending over the coarse marking is brought in alignment with the cutting depth marking 107 by turning of the transmission housing 13 together with the cover hood 14 about the axis 28. In this position the clamping lever 64 is tightened. Now the saw blade 18 projects with millimeter accuracy under the base plate 22 so that with the adjusted cutting depth the saw can be used for conventional displacement sawing.

For the concrete embodiment the depth adjustment of a cutting depth of 52 mm is illustrated hereinbelow:

After the adjustment of the negative cutting depth by arresting of the transmission housing 13 relative to the cutting depth guiding bracket 50, the abutment bracket 75 is brought with its zero line 89 in alignment with the scale line on the scale 54 of the cutting depth guiding bracket 50 which marks 50 millimeter. In this position the arresting pin 84 arrests the abutment bracket 75 in one of the arresting openings 58 of the cutting depth guiding bracket 50. The second partial line from the zero line 89 in direction to the tenth partial line marks thereby exactly the 52 mm nominal cutting depth. The cutting depth marking 107 of the cover hood 14 is brought in alignment with this second fine scale line by lowering relative to the cutting depth guiding bracket 50. After tightening the clamping lever 64, the hand circular saw 10 can be adjusted for the displacement sawing with the cutting depth 52 mm.

For plunge sawing with the hand circular saw 10 with a predetermined, preselected or adjusting cutting depth limit, the transmission housing 13 together with the mounted guiding support 66 as well as the abutment 73 is turned upwardly and arrested in the position of the negative cutting depth. The clamping screw 62 is therefore released.

The abutment bracket 75 is manually displaced upwardly relative to the cutting depth guiding bracket 50 so far, until the diamond 79 coincides with the nominal cutting depth value on the scale 54 of the cutting depth guiding bracket 50, and with the abutment bracket 75 its abutment strip 90 is moved. It should be mentioned that the cutting depth is adjustable only in 5 mm steps, since the arresting openings 58 on the outer surface 53 of the cutting depth guiding bracket 50 are arranged in 5 mm distance. The transmission housing 13 can be adjusted now together with the saw blade 18 and the guiding support 66 until it abuts against the abutment 73 on the abutment strip 90. The saw blade 18 cannot plunge into the workpiece farther than this position.

The transmission housing 13 with the saw blade 18 can every time turned upwardly in an opposite direction of smaller or negative cutting depths. The maximal cutting depth is adjusted when the abutment bracket 75 is located in its lowermost position sitting on the base plate 22.

The above described cutting depth preselection is independent from the miter angle adjustable between 90° and 45° by a turning movement about the coulisse 32 or turning axis 44.

The leg 49 of the cutting depth guiding bracket 50 which extends parallel to the saw blade 18 engages between the transmission housing 13 and the guiding support 66 in a tongue-like manner. Being supported by the arresting-supporting balls 67, 68, it forms a play-free prismatic guide with a rolling friction for the transmission housing 13 during upward and downward turning around the axis 28 for changing or adjustment of the cutting depth. This guiding device can take up the tilting force which acts on the transmission housing 13 during plunge sawing at the miter angles between 35° and 45°. Through the arresting-supporting balls 67, 68, the forces between the cutting depth guiding bracket 50 and the transmission housing 13 are transmitted with roller friction with low resistance and comfortably for the operator, since in condition of the high supporting force and low friction a jerk free adjustment of the cutting depth is possible.

Tilting forces are taken up to the level of the spring forces on the balls in the guiding support 66. Since the balls must however be smoothly rollable for providing a jerk free plunge sawing, the spring force prescribes certain limits. During high tilting forces the arresting-supporting balls 67, 68 are displaced backwards, there is a danger of the canting of the transmission housing 13 and thereby the saw blade 18 in the cutting joint 42. This canting is held within certain limits also in condition of maximal tilting forces by a support of the abutment bracket 75 with its guiding strip 80 in the gap or in the intermediate space 92 between the transmission housing 13, the cover hood 14 and the cutting depth guiding bracket 50. The abutment bracket 75 narrowly corresponds to the cutting depth guiding bracket 50, so that all three parts can move relative to one another in a jerk free manner. Thereby even in the condition of high side forces, the transmission housing 13 and thereby also the saw blade 18 are canted only insignificantly.

A special advantage of the present invention is that the cutting depth guiding bracket is especially bending-resistant because of its angularly profiled construction and is reinforced further by its profile connection with the arcuate coulisse block. Therefore with the small distance to the coulisse, only low deformation forces are transmitted from the base plate to the cutting depth guiding bracket when the miter angle or the cutting depth are adjusted.

The negative cutting depth is characterized by the position of the saw blade above the ground plate, in which the saw teeth cannot contact the workpiece.

The cutting depth guiding bracket 50 has an L-shaped construction and at least double-time, prism-guided coupling with the transmission housing 13. Thereby the transmission housing 13 and the saw blade 18 with it is guided relative to the guide plate 22 in its plane with respect to all degrees of freedom, so that in this plane every movement of the transmission housing 13 relative to the base plate 22 is minimized. Thereby, a highest degree of accuracy during the cutting depth change is obtained.

It will be understood that each of the elements described above, or two or more together, may also find a useful application in other types of constructions differing from the types described above.

While the invention has been illustrated and described as embodied in a hand circular saw with swinging protective hood and cutting depth adjusting device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand circular saw, comprising a swinging protective hood; a housing which carries a saw shaft axis and a saw blade held rotatable about said saw shaft axis; a base plate, said housing being arranged independently turnably relative to said base plate around two further axes extending substantially perpendicular to one another, a first of said further axes being parallel to said saw shaft axis for guiding a turning movement for adjusting a cutting depth and is adjustable on a cutting depth guiding bracket with a scale, while a second of said further axes extends parallel to both said base plate and said saw blade for guiding a turning movement for adjusting a miter angle, said cutting depth guiding bracket having an angle-profile shaped cross-section and having at least one leg which is formed as a sliding guide supporting said housing in each cutting depth position; an abutment for proselecting a cutting depth limit, said abutment being formed as an abutment strip carried by an abutment bracket, said abutment bracket being longitudinally displaceable relative to said cutting depth guiding bracket and said housing; and arresting means for arresting said abutment bracket relative to said cutting depth guiding bracket.

2. A hand circular saw as defined in claim 1, wherein said abutment bracket is longitudinally displaceable between said cutting depth guiding bracket and said housing.

3. A hand circular saw as defined in claim 1; and further comprising a button arranged on said abutment bracket and releasing said arresting means so as to unlock said abutment bracket from said cutting depth guiding bracket.

4. A hand circular saw as defined in claim 1; and further comprising an abutment member connected with said housing, said abutment strip being arranged on a movement path of said abutment member and is adjustable relative to said cutting depth guiding bracket by a displacement of said abutment bracket.

5. A hand circular saw as defined in claim 1; and further comprising a guide support for guiding said housing; and an abutment member which forms a part of said guide support and is connected with said housing so that said abutment member together with said housing engages with said leg of said cutting depth guiding bracket.

6. A hand circular saw, comprising a swinging protective hood; a housing which carries a saw shaft axis and a saw blade held rotatable about said saw shaft axis; a base plate, said housing being arranged independently turnably relative to said base plate around two further axes extending substantially perpendicular to one another, a first of said further axes being parallel to said saw shaft axis for guiding a turning movement for adjusting a cutting depth and is adjustable on a cutting depth guiding bracket with a scale, while a second of said further axes extend parallel to both said base plate and said saw blade for guiding a turning movement for adjusting a miter angle, said cutting depth guiding bracket having an angle-profile shaped cross-section and having at least one leg which is formed as a sliding guide supporting said housing in each cutting depth position; and at least one prismatic guide arranged between said cutting depth guiding bracket and said housing.

7. A hand circular saw as defined in claim 6, wherein said cutting depth guiding bracket has another leg, said legs having opposite leg surfaces, said housing having corresponding housing surfaces, said housing surfaces being guided on said leg surfaces.

8. A hand circular saw as defined in claim 6; and further comprising an abutment bracket cooperating with said housing, said prismatic guide being formed between ends of said leg jointly with said abutment bracket and said housing.

9. A hand circular saw as defined in claim 6, wherein said cutting depth bracket and said housing are elastically supported over one another in the region of said prismatic guide.

10. A hand circular saw as defined in claim 9; and further comprising spring means which provide an elastic support of said cutting depth guiding bracket, said housing and said primeter guide against one another.

11. A hand circular saw as defined in claim 6; and further comprising means for flatly pretensioning said housing relative to said cutting depth guiding bracket.

12. A hand circular saw as defined in claim 6, wherein said cutting depth guiding bracket has a profile with which it engages said housing.

13. A hand circular saw as defined in claim 12, wherein said profile is a C-shaped profile.

14. A hand circular saw as defined in claim 12, wherein said profile is an L-shaped profile.

15. A hand circular saw as defined in claim 12, wherein said profile is a box-shaped profile.

16. A hand circular saw, comprising a swinging protective hood; a housing which carries a saw shaft axis and a saw blade held rotatable about said saw shaft axis; a base plate, said housing being arranged independently turnably relative to said base plate around two further axes extending substantially perpendicular to one another, a first of said further axes being parallel to said saw shaft axis for guiding a turning movement for adjusting a cutting depth and is adjustable on a cutting depth guiding bracket with a scale, while a second of said further axes extends parallel to both said base plate and said saw blade for guiding a turning movement for adjusting a miter angle, said cutting depth guiding bracket having an angle-profile shaped cross-section and having at least one leg which is formed as a sliding guide supporting said housing in each cutting depth position; a guiding support for said housing; and spring means arranged so that said housing by means of said guiding support and through said spring means is supported relative to said cutting depth guiding bracket, said spring means being arrestable on said cutting depth guiding bracket in a position of a negative cutting depth.

17. A hand circular saw as defined in claim 16, wherein said housing is elastically supported relative to said cutting depth guiding bracket.

18. A hand circular saw as defined in claim 16, wherein said housing is rollably supported relative to said cutting depth guiding bracket.

19. A hand circular saw, comprising a swinging protective hood; a housing which carries a saw shaft axis and a saw blade held rotatable about said saw shaft axis; a base plate, said housing being arranged independently turnably relative to said base plate around two further axes extending substantially perpendicular to one another, a first of said further axes being parallel to said saw shaft axis for guiding a turning movement for adjusting a cutting depth and is adjustable on a cutting depth guiding bracket with a scale, while a second of said further axes extend parallel to both said base plate and said saw blade for guiding a turning movement for adjusting a miter angle, said cutting depth guiding bracket having an angle-profile shaped cross-section and having at least one leg which is formed as a sliding guide supporting said housing in each cutting depth position; and an abutment bracket for said housing, said cutting depth guiding bracket having a back provided with a scale, said abutment bracket having a back provided with a window for said scale, and having a further scale for a fine adjustment of the cutting depth relative to said scale of said cutting depth guiding bracket.

20. A hand circular saw as defined in claim 19; and further comprising a guiding support for said housing, said guiding support elastically abutting against said abutment bracket and presses said abutment bracket against said cutting depth guiding bracket.

21. A hand circular saw as defined in claim 20, wherein said guiding support has an inner edge and non-releasably carries arresting-supporting balls, said balls being supported against springs in an interior of said guiding support and extending outwardly beyond said inner edge of said guiding support.

22. A hand circular saw, comprising a swinging protective hood; a housing which carries a saw shaft axis and a saw blade held rotatable about said saw shaft axis; a base plate, said housing being arranged independently turnably relative to said base plate around two further axes extending substantially perpendicular to one another, a first of said further axes being parallel to said saw shaft axis for guiding a turning movement for adjusting a cutting depth and is adjustable on a cutting depth guiding bracket with a scale, while a second of said further axes extends parallel to both said base plate and said saw blade for guiding a turning movement for adjusting a miter angle, said cutting depth guiding bracket having an angle-profile shaped cross-section and having at least one leg which is formed as a sliding guide supporting said housing in each cutting depth position; and an abutment bracket for said housing, said abutment bracket having an open four-cornered hollow profile which engages with said cutting depth guiding bracket, said cutting depth guiding bracket having a depth guiding slot, while said abutment bracket has a projection engaging in said depth guiding slot.

23. A hand circular saw as defined in claim 22, wherein said abutment bracket has a further projection which is formed as a guiding strip and retained in an intermediate space between said housing and said cutting depth guiding bracket.

24. A hand circular saw, comprising a swinging protective hood; a housing which carries a saw shaft axis and a saw blade held rotatable about said saw shaft axis; a base plate, said housing being arranged independently turnably relative to said base plate around two further axes extending substantially perpendicular to one another, a first of said further axes being parallel to said saw shaft axis for guiding a turning movement for adjusting a cutting depth and is adjustable on a cutting depth guiding bracket with a scale, while a second of said further axes extend parallel to both said base plate and said saw blade for guiding a turning movement for adjusting a miter angle, said cutting depth guiding bracket having an angle-profile shaped cross-section and having at least one leg which is formed as a sliding guide supporting said housing in each cutting depth position; and an abutment bracket for said housing said abutment bracket engaging in an intermediate space of said housing and forming a member which is supported against said housing, said member being non-releasably and longitudinally displaceably retained between said cutting depth bracket and said housing.

25. A hand circular saw as defined in claim 24, wherein said member of said abutment bracket is formed as a guiding strip.

26. A hand circular saw as defined in claim 24, wherein said member of said abutment bracket is formed as an L-profiled part.

27. A hand circular saw, comprising a swinging protective hood; a housing which carries a saw shaft axis and a saw blade held rotatable about said saw shaft axis; a base plate, said housing being arranged independently turnably relative to said base plate around two further axes extending substantially perpendicular to one another, a first of said further axes being parallel to said saw shaft axis for guiding a turning movement for adjusting a cutting depth and is adjustable on a cutting depth guiding bracket with a scale, while a second of said further axes extends parallel to both said base plate and said saw blade for guiding a turning movement for adjusting a miter angle, said cutting depth guiding bracket having an angle-profile shaped cross-section and having at least one leg which is formed as a sliding guide supporting said housing in each cutting depth position, said cutting depth guiding bracket having a rear surface formed as a circular ring portion which is curved around said first axis.

* * * * *